United States Patent [19]

Shiban

[11] 4,210,539
[45] Jul. 1, 1980

[54] WATER SCREEN

[76] Inventor: Samir S. Shiban, 870 Armstrong, Eugene, Oreg. 97404

[21] Appl. No.: 949,693

[22] Filed: Oct. 10, 1978

[51] Int. Cl.² .............................................. B01D 33/06
[52] U.S. Cl. ..................................... 210/391; 210/402
[58] Field of Search ............................... 210/157–159, 210/161, 354, 393, 394, 402, 391

[56] References Cited

U.S. PATENT DOCUMENTS

| | | | |
|---|---|---|---|
| 1,157,009 | 10/1915 | Lara | 210/354 |
| 2,321,243 | 6/1943 | Range | 210/354 X |
| 2,608,952 | 9/1952 | Herbert | 210/354 X |
| 3,452,875 | 7/1969 | Rich et al. | 210/402 X |
| 3,843,520 | 10/1974 | Bottorf | 210/393 X |
| 3,882,025 | 5/1975 | Talley, Jr. | 210/354 |

FOREIGN PATENT DOCUMENTS

| | | | |
|---|---|---|---|
| 1222763 | 6/1960 | France | 210/161 |
| 2332958 | 11/1975 | France | 210/354 |

Primary Examiner—William A. Cuchlinski, Jr.
Attorney, Agent, or Firm—James D. Givnan, Jr.

[57] ABSTRACT

A water screen for submergence within a body of water with the screen being supported by a pump intake conduit. A support structure of the screen in place on the intake conduit supports a rotatable screen. A backwash system includes conduits with spray orifices discharging a pressurized flow of water against the screen interior to backwash the screen as well as impart rotation thereto. A modified screen structure is powered by a motor.

10 Claims, 9 Drawing Figures

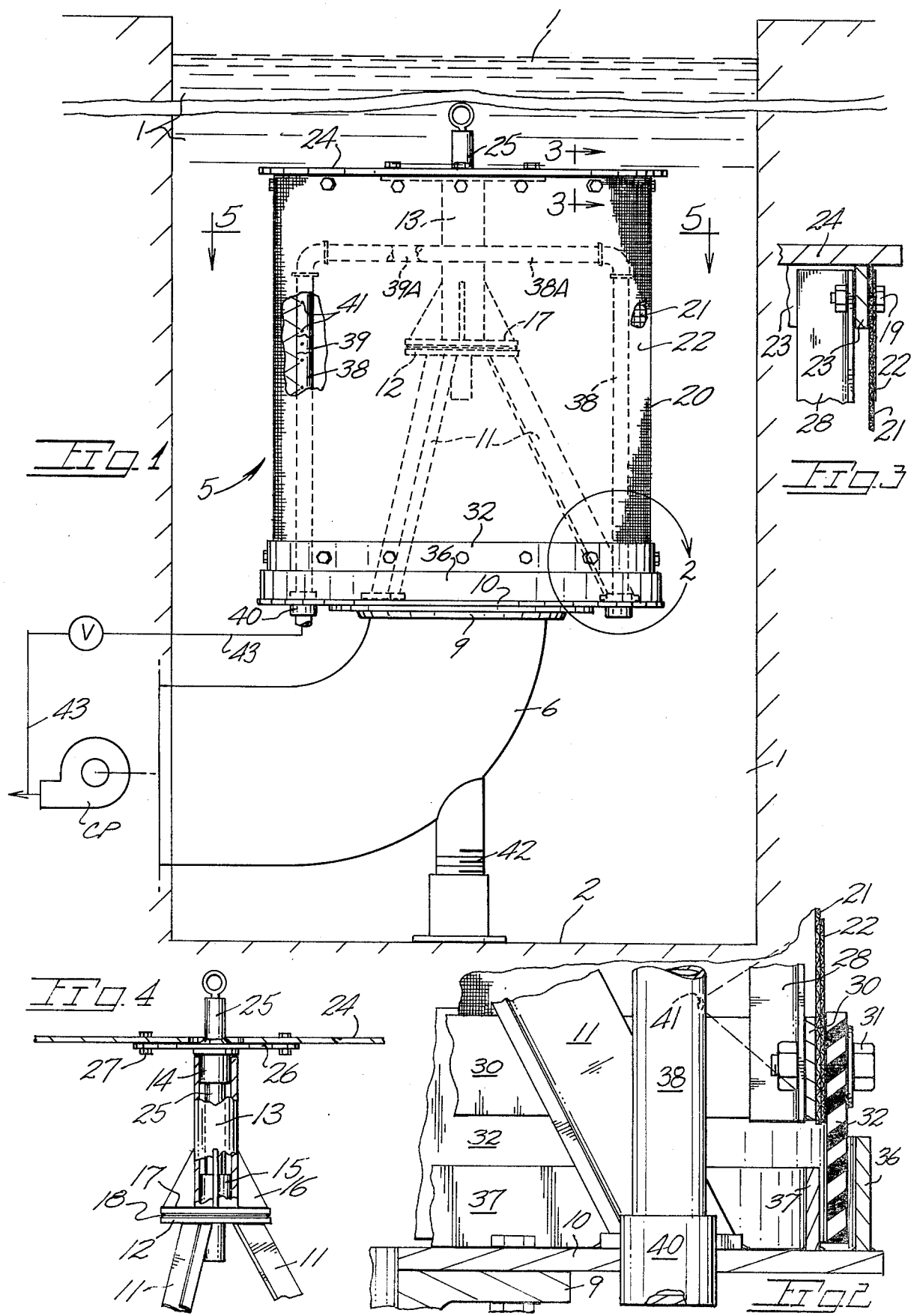

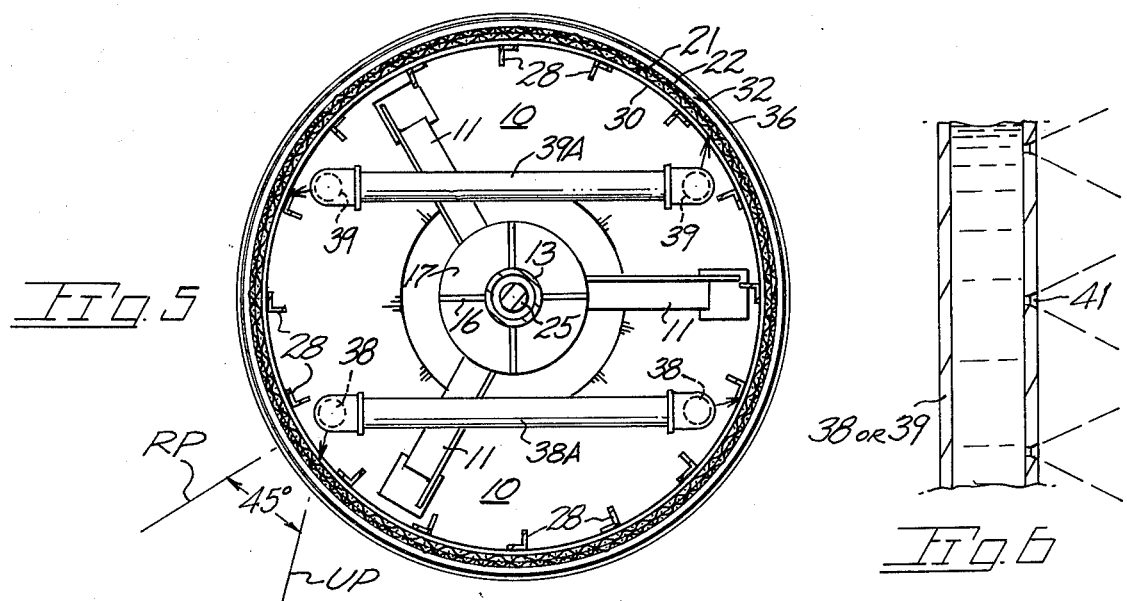
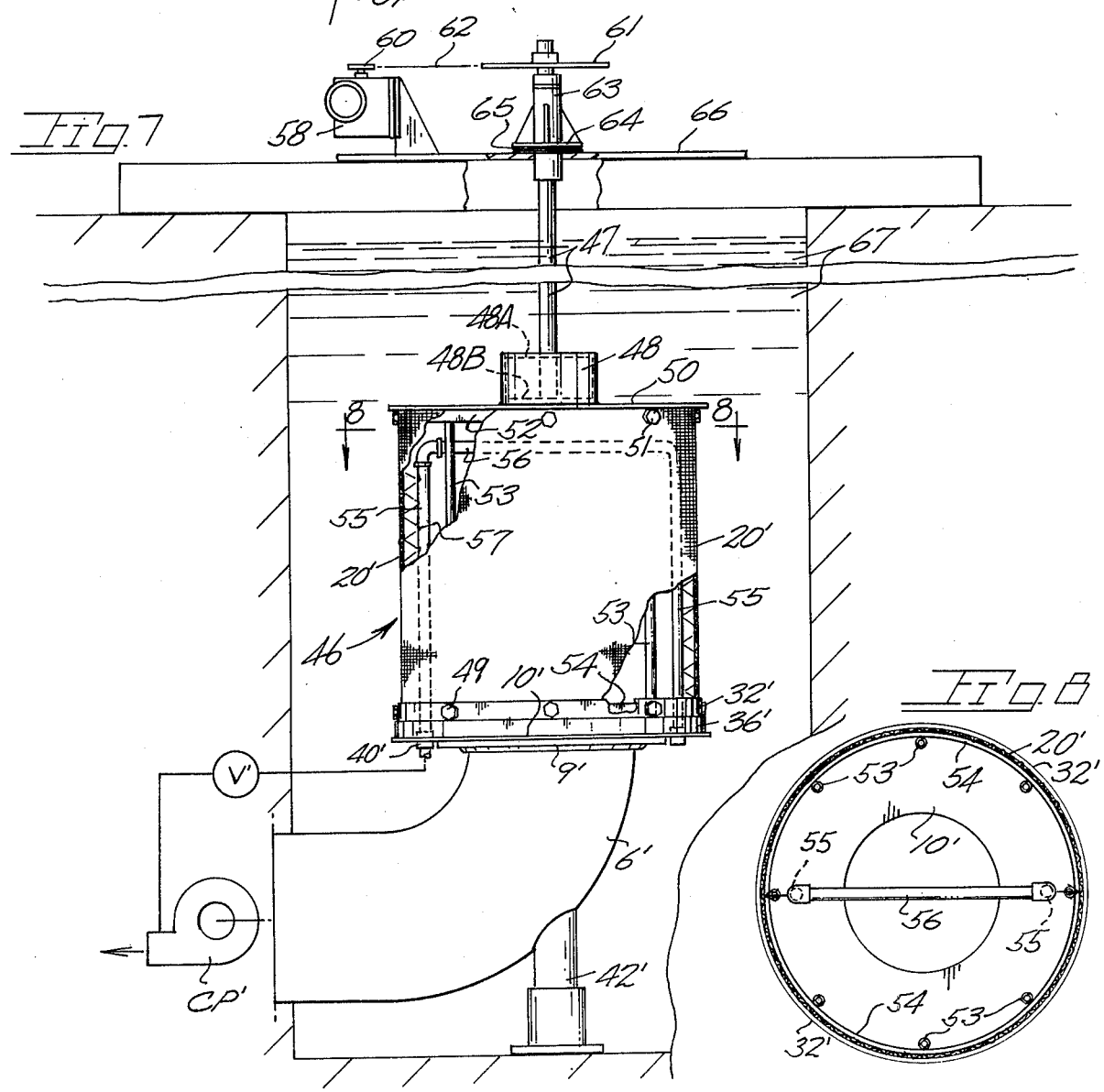

WATER SCREEN

BACKGROUND OF THE PRESENT INVENTION

The present invention concerns water screens and particularly a rotatable screen for submergence within a body of water.

Water used in various industrial operations must be free of particulate that would clog or at least impede the operation of water using equipment. Recent governmental requirements dictate that water utilized in the industrial operation must meet strict standards prior to return of the water to the stream, river, or other source. Accordingly, many industrial operations have found it economically advisable to recycle large volumes of water with the water being stored in a settling pond or other reservoir. Debris in the body of water in the form of suspended solids above a certain size must be screened or filtered out prior to water reuse. Locationing of a water screen at or near water level incurs the disadvantage of being clogged by a concentration of floating debris while conversely a screen at the lowermost level of a body of water is subjected to a concentration of settled debris.

An additional drawback to known water screens is their complexity and resultant high cost as well as high installation costs attributable to complex support structures.

Water screens within the prior art include that screen disclosed in U.S. Pat. No. 3,843,520 which includes a floating screen component and which includes propulsion nozzles tangentially disposed to the screen. This screen, as well as the screens disclosed in U.S. Pat. Nos. 3,333,700; 3,311,235; 2,685,235 and 2,191,122 includes a backwash system whereby pressurized water is directed through the screen opposite to the filter flow direction for particle dislodgment from the screen exterior.

SUMMARY OF THE PREFERRED EMBODIMENTS

The present invention is embodied within a rotatable water screen for submergence intermediate the upper and lower limits of the body of water and suitable for placement on the inlet end of a pump intake or suction conduit to remove suspended matter from the body of water outflow.

A support structure of the water screen journals the drum for rotation imparted thereto by a backwash drive system ejecting water against the screen interior. The backwash drive system comprises multiple conduits each having a series of spray orifices emitting directionalized sprays. A source of backwash water may conveniently be a valve regulated flow bled from the pressure side of a pump drawing filtered water through the water screen. Other sources of backwash water may be employed if so desired.

A modified form of the present water screen, particularly suited for higher volumes is of somewhat greater screen area and utilizes a motor for drum rotation.

Important objectives of the present invention include the provision of a compact, lightweight water screen for submergence within a body of water and supported by the inlet end of an associated conduit to provide a water screen having low installation and maintenance costs and yet capable of high flow rates; the provision of a water screen submerged to benefit significantly from combined hydrostatic and atmospheric pressure and with its outlet communicating with a pump intake both greatly contributing to a high volume by reason of a substantial pressure drop across the screen; the provision of a low maintenance water screen subjected to only suspended particles by reason of the screen being located away from upper and lower extremes of the body of water; the provision of a water screen wherein a backwash system dually serves to rotate the screen to avoid costly submersible drum powering motors, gear boxes, etc., all costly and oftimes troublesome; the provision of a water screen which readily lends itself to being powered by a novel submerged drive system or an exposed system, the latter particularly suitable for large diameter screens.

BRIEF DESCRIPTION OF THE DRAWINGS

In the accompanying drawings:

FIG. 1 is a side elevational view of the water screen disposed within a sump with related pump and valve components shown schematically;

FIG. 2 is an enlarged detailed view of that portion of the screen encircled at 2;

FIG. 3 is an enlarged detailed sectional view taken along line 3—3 of FIG. 1;

FIG. 4 is a fragmentary elevational view of drum support structure;

FIG. 5 is a horizontal sectional view taken downwardly aloing line 5—5 of FIG. 1;

FIG. 6 is a vertical sectional view on an enlarged scale of a backwash conduit;

FIG. 7 is a view similar to FIG. 1 but showing a modified water screen;

FIG. 8 is a horizontal sectional view taken downwardly along line 8—8 of FIG. 7.

DETAILED DESCRIPTION OF THE PREFERRED EMBODIMENTS

Figure 9:
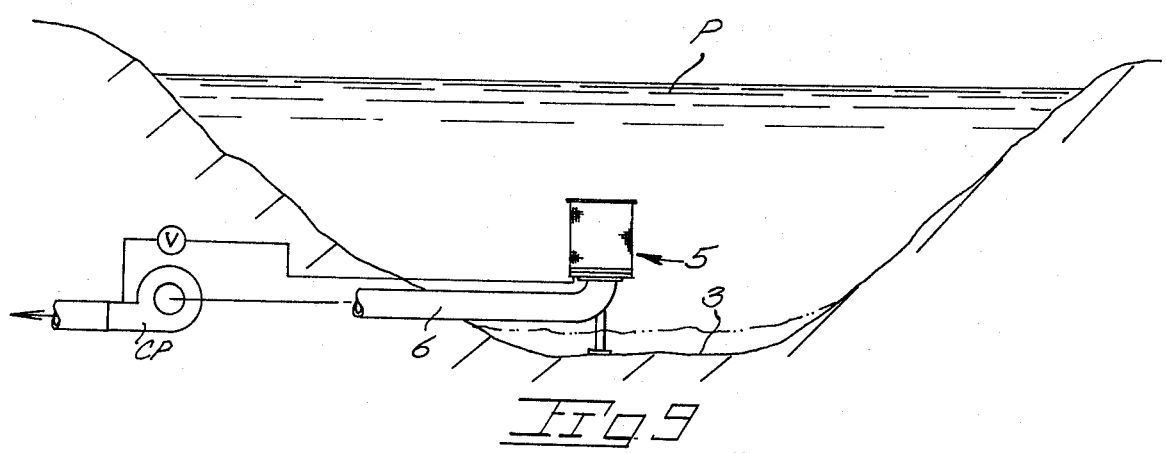
FIG. 9 is a sectional view of a settling pond with water screen submerged therein.

With continuing attention to the drawings, the reference numeral 1 indicates a body of water which may be a sump. The body of water may be a pond P with a bottom or bed 3 (FIG. 9).

The present water screen is indicated generally at 5 in FIG. 1 and shown submerged in place on the inlet end of a pump intake or suction conduit 6 with the water screen being above the bottom 2 of the sump or above the bed 3 of the body of water. The compact light weight nature of the present water screen by reason of its capability for high volume enables same to be supported by the intake end of conduit 6 however, it is to be understood that the present screen could be supported by conduits other than the elbow shown.

Secured to the inlet end of conduit 6 is a flange 9 which in turn carries an annular base plate 10 which plate constitutes part of a support structure which additionally includes legs 11 secured in a tripodal manner on said plate and jointly supporting at their upper ends a platform 12. Said platform positions a bearing housing 13 within which are disposed upper and lower bearing sleeves 14 and 15 which bearings are preferably of a durable synthetic material. Housing 13 is braced by gussets 16 welded along their bottom edges to a plate 17 with leveling shims 18 disposed between plate 17 and platform 12.

A drum shaped screen structure includes a circular screen structure 20 which may be of expanded metal 21 which reinforces exteriorly applied stainless steel wire cloth 22 (FIG. 3) of approximately a sixteen mesh rating. The upper edge of the layered screen is affixed by fasteners 19 to a rolled ring 23 secured as by welding to the underside of a top plate 24 of the drum shaped screen structure. With reference to FIG. 4, it will be seen that drum top plate 24 is centrally open to receive a pivot pin 25 which extends through and is secured to a support plate 26 which in turn carries top plate 24 of the drum bolted thereto at 27. Accordingly, the drum structure is suitably supported by pivot pin 25 and bearings 14 and 15 with the pivot pin 25 and drum structure being upwardly detachable from the support structure. Shims 18 enable adjustment of drum height relative to base plate 9 to assure a desired seal therebetween as later described.

With attention back to the rotatable drum structure, upright angle members at 28 are spaced about rolled metal ring 23 and secured thereto by fasteners 19. A lower ring at 30 interconnects the lower ends of the angles with fasteners 31 extending therethrough and through rubber belting at 32 which depends from the screen lower periphery.

Rubber belting 32 constitutes an annular seal which cooperates with base plate mounted flange means including outer and inner upstanding flanges 36 and 37 carried by base plate 10.

A backwash system includes pairs of communicating pipes 38 and 39 each pipe located adjacent the inner surface of screen 20 with the pipe lower ends mounted in place by plate secured collars 40. Pipe segments 38A-39A communicate each pair of pipes. The pipes 38-39, as shown in FIG. 6, are each drilled to provide a series of orifices 41 with one series staggered relative the remaining series. Each orifice is countersunk to provide a conical outer portion for emission of a conical spray pattern which impinges against the screen interior and the angle members 28. With attention to FIG. 5, the spray discharge is directionalized by reason of the orifices of each pipe being located within an upright plane UP which plane intersects a true radial plane RP of the drum structure, the radial plane containing both the drum axis and the axis of the upright pipe within which the orifices are formed. It has been found practical to locate the orifice plane so as to intersect the true radial plane at approximately 45 degrees in order that the sprays accomplish the dual function of backwashing and driving the screen. The orifice discharge from the staggered series impinges along the full height of the screen interior with at least one series discharge at all times impinging against at least some of the angle members 28. The angular flanges "catch" the spray.

An adjustable support at 42 braces the conduit intake 6.

Intake 6 is in downstream communication with a pump CP which may be of the centrifugal type provided with suitable controls. A convenient source of backwash water at a suitable pressure (50-70 PSI) may be a bleed line 43 off the pressure side of pump CP with the bleed line having a flow control valve V therein for regulation of backwash pressure. Line 43 is branched to supply one upright pipe of each pair of backwash pipes 38-39.

In FIGS. 7 and 8 I disclose a modified water screen wherein parts corresponding to the first described form of the invention are indicated with like prime reference numerals. In this modification a motorized drive is provided for the screen with the backwash system serving solely to purge the screen surface of collected debris. This version is intended for installations requiring a larger volume of screen flow with a larger intake size.

The modified water screen is indicated generally at 46 in place, but not restrictively so, on the inlet end of an intake conduit 6'. The tripodal support structure is dispensed with and the drum shaped screen structure supported by a shaft 47 which terminates downwardly in securement to a torque transmitting structure 48 having a pair of spaced plates 48A-48B secured to said shaft. Structure 48 is welded to a drum top plate 50.

The circular screen structure 20' is secured to drum top plate 50 with fasteners 51 extending through the screen, through a rolled ring 52, and through upright members 53 of the screen drum structure. Upright members 53 terminate downwardly in fastened securement to a lower ring 54 which, as in the first described form of the invention, carries a parametrical seal 32' which coacts with upstanding flange 36' and an inner flange on plate 10' to provide a water barrier. Fastener assemblies 49 extend through seal 32', screen 20', ring 54 and upright members 53 in similar fashion to that disclosed in FIG. 2.

A backwash system includes a pair of diametrically disposed upright pipes 55 interconnected by a horizontal pipe segment 56. As before each pipe 55 is drilled and countersunk to provide orifices 57 which discharge conical sprays radially against the screen interior.

A drive system for the modified water screen includes a gearhead motor 58, driving and driven sprockets 60 and 61 and a roller chain 62 constituting power transmission means. A bearing housing 63 incorporates suitable radial and thrust bearings with a housing plate 64 supported by inserted shims 65 which fit intermediate plate 64 and a drive platform 66 supported athwart a sump 67 constituting a body of water. Shims 65 enable precise locationing of the rotating structure and particularly flexible seal 32' relative the static water screen structure. The drive provides a rotational speed of 3-5 RPM to continuously expose the drum screen to the backwash sprays. Flexible seal 32' is effective regardless of imprecise drum rotation.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A water screen for total submergence in a body of water acted on by atmospheric pressure for removal of suspended matter from an outflow, said screen comprising, a conduit in communication with the intake side of a pump and having an inlet end for submerged disposition in the body of water and through which a screened outflow passes, a support structure including a base plate in place on said inlet end of the conduit, an upright drum shaped screen structure for submerged disposition in the body of water and rotatably supported by said support structure, said screen structure closed at its upper end, a backwash system within said screen structure and comprising conduits receiving a pressurized flow of water and having orifices discharging a backwash flow against the drum interior in a chordal direction with the backwash flow additionally imparting rotation to said screen, and said screen structure having a substantial pressure drop thereacross by reason of both atmospheric and hydrostatic pressure being applied to the submerged screen structure exterior.

2. The water screen claimed in claim 1 wherein the orifices in one of said backwash conduits are in a plane intersecting at an acute angle a true radial plane containing the axes of the screen structure and said one conduit.

3. The screen claimed in claim 2 wherein said drum shaped screen structure includes a flexible seal at its lower peripheral edge for sealing contact with said base plate, said base plate including upright flange means cooperable with said flexible seal.

4. The screen claimed in claim 1 wherein said screen structure includes a spaced apart upright angle members extending lengthwise of the drum interior and having inwardly directed surfaces to provide an impact surface for the backwash flow to facilitate drum rotation by the backwash flow.

5. The screen claimed in claim 1 wherein said drum shaped screen structure includes a depending flexible seal at its lower end, flange means on said base plate, said seal in effective sealing engagement with said flange means regardless of imprecise screen rotation.

6. In a rotatable fully submerged water screen of drum configuration having backwash conduit means offset inwardly from the interior of the screen, the improvement comprising, orifices formed in said conduit means to direct a backwash flow against the screen interior, said conduit orifices in a plane intersecting at an acute angle a true radial plane containing the upright axes of the drum structure and the conduit to provide a chordally directed flow against the screen interior to also rotate the screen.

7. The improvement claimed in claim 6 additionally including upright angle members spaced about and extending lengthwise of the inner periphery of said water screen against which the chordally directed flow impinges.

8. The improvement claimed in claim 7 wherein said upright angle members are spaced about the screen inner periphery so as to have at least some of said upright members at all times receiving a chordally directed flow to assure screen rotation.

9. A water screen for removal of suspended matter from an outflow of a body of water, said screen comprising,
    a conduit in communication with the intake side of a pump and having an inlet end for disposition in the body of water and through which a screened outflow passes,
    a support structure in place on said conduit end and including a base plate having upright flange means thereon,
    a drum shaped screen structure for total submergence in the body of water and including a depending flexible seal at its lower end in engagement with said flange means, said seal effective regardless of imprecise screen rotation, said screen structure having a substantial pressure drop thereacross by reason of atmospheric and hydrostatic pressure applied to the screen exterior, said screen structure closed at its upper end,
    a backwash system within said screen structure and comprising conduit means receiving a pressurized flow of water and having orifices discharging a backwash flow against the drum interior,
    a motor and power transmission means for driving the screen structure and disposed above the body of water, and
    a shaft driven by said transmission means and terminating in securement to said screen structure for supporting same and imparting rotation thereto.

10. The water screen claimed in claim 9 wherein said motor and power transmission means additionally includes a bearing housing having bearing means therein supporting said shaft against radial and thrust loads, said shaft thereby adapted to support said screen structure for rotation.

* * * * *